US011494873B2

(12) United States Patent
Badeau et al.

(10) Patent No.: US 11,494,873 B2
(45) Date of Patent: Nov. 8, 2022

(54) AUTOMATED TFM GRID RESOLUTION SETUP TOOLS

(71) Applicant: Evident Canada, Inc., Québec (CA)

(72) Inventors: Nicolas Badeau, Quebec (CA); Guillaume Painchaud-April, L'Ancienne-Lorette (CA)

(73) Assignee: Evident Canada, Inc., Québec (CA)

( * ) Notice: Subject to any disclaimer, the term of this patent is extended or adjusted under 35 U.S.C. 154(b) by 0 days.

(21) Appl. No.: 17/066,798

(22) Filed: Oct. 9, 2020

(65) Prior Publication Data

US 2022/0114696 A1    Apr. 14, 2022

(51) Int. Cl.
  *G06T 3/40*      (2006.01)
  *G01N 29/06*     (2006.01)
  *G06T 11/20*     (2006.01)

(52) U.S. Cl.
  CPC ....... *G06T 3/4007* (2013.01); *G01N 29/0654* (2013.01); *G06T 11/206* (2013.01)

(58) Field of Classification Search
  CPC .......................... G06T 3/4007; G06T 11/206
  See application file for complete search history.

(56) References Cited

U.S. PATENT DOCUMENTS

| | | | |
|---|---|---|---|
| 2018/0180578 A1* | 6/2018 | Habermehl | G01N 29/07 |
| 2019/0076101 A1* | 3/2019 | Pan | A61B 6/032 |
| 2019/0277807 A1 | 9/2019 | Hayashi et al. | |

FOREIGN PATENT DOCUMENTS

| | | |
|---|---|---|
| WO | WO-2020038885 A1 | 2/2020 |
| WO | 2022073120 | 4/2022 |

OTHER PUBLICATIONS

Perez et al., Total Focusing Method with Subsampling in Space and Frequency Domain for Ultrasound NDT, 2019 IEEE International Ultrasonics Symposium (IUS), pp. 2103-2106 (Year: 2019).*
"International Application Serial No. PCT/CA2021/051402, International Search Report dated Jan. 26, 2022", 4 pgs.
"International Application Serial No. PCT/CA2021/051402, Written Opinion dated Jan. 26, 2022", 5 pgs.
"M2M Capture V3.1: New Features Description", Eddyfi Technologies, (Mar. 2020), 1-35.
"User Manual M2M Capture Part 1", Eddyfi Technologies, (Mar. 20, 2019), 1-100.
"User Manual MM Capture Part 2", Eddyfi Technologies, (Mar. 20, 2019), 101-186.
Reverdy, Frederic, "Capture™ 3.1: New Features for Faster and Better Inspections", Eddyfi Technologies, Retrieved from <https://blog.eddvfi.com/en/capture-31-new-features-for-faster-and-better-inspections>, (Apr. 16, 2020), 8 pgs.
Reverdy, Frederic, "Code Compliant Amplitude Fidelity for TFM", Eddyfi Technologies, Retrieved from: <https://blog.eddyfi.com/en/codecompliant-amplitude-fidelity-for-tfm>, (Dec. 16, 2019), 4 pgs.

* cited by examiner

*Primary Examiner* — Samantha (Yuehan) Wang
(74) *Attorney, Agent, or Firm* — Schwegman Lundberg & Woessner, P.A.

(57) ABSTRACT

Examples of the present subject matter provide techniques for calculating amplitude fidelity (AF) for a variety of grid resolutions using a single TFM image of a specified flaw. Thus, the grid resolution may be set so that it yields a desired AF using a calculation process without performing a blind iterative process. Moreover, examples of the present subject matter may measure AF in more than one axis, improving accuracy.

18 Claims, 10 Drawing Sheets

AUTOMATED TFM GRID RESOLUTION SETUP TOOLS

TECHNICAL FIELD

The present disclosure generally relates to non-destructive inspection using total-focusing method (TFM).

BACKGROUND

Ultrasonic inspection can be a useful inspection technique for a variety of structures. Inhomogeneities on or within the structure under test can generate scattered or reflected acoustic signals in response to a transmitted acoustic pulse. Such acoustic "echoes" can be received and processed. The processing can include reconstruction of an image corresponding to a region of the structure under test, for review by an inspector or for archival. Features within the structure that can be detected and thereby imaged include interfaces between materials having different acoustic propagation characteristics, such as voids, cracks, or other flaws, and structures such as welds, joints, cladding layers, or surfaces.

Processing of received acoustic echo signals to form images can involve various techniques. In one approach, a technique called a "total focusing method" (TFM) can be used, which can involve a full-matrix capture (FMC) acquisition scheme where focus can be achieved across a broad spatial region on or within a structure under test. TFM is integrated in various inspection codes and standards such as ASME Section V (2019 ASME Boiler and Pressure Vessel Code, Section V: Nondestructive Examination) and ISO 23865 (Non-destructive testing—Ultrasonic testing—General use of full matrix capture/total focusing technique (FMC/TFM)). These codes can require an operator to ensure the TFM grid resolution allows an amplitude fidelity (AF) at a certain level (e.g., 2 dB or less). AF corresponds to the maximum amplitude variation of a specific flaw caused by the resolution (e.g., distance between two grid points of the TFM grid). Generally, the coarser the grid resolution, the higher AF value it will produce.

Consequently, a technician can set the grid resolution to produce a certain AF value using an iterative trial-and-error process. That is, the technician can set the grid resolution at a first value, obtain a TFM image of a specified flaw, measure the amplitude variation by moving the TFM grid one direction (e.g., horizontal direction), and calculate the AF value. Then, if the calculated AF value is not at the desired value, the technician will adjust the grid value accordingly and repeat the process until it yields the desired AF value.

BRIEF DESCRIPTION OF THE DRAWINGS

Various ones of the appended drawings merely illustrate example implementations of the present disclosure and should not be considered as limiting its scope.

DETAILED DESCRIPTION

The inventors have recognized, among other things, a need in the art for an inspection system that overcomes the challenges discussed above. Examples of the present subject matter provide techniques for calculating the AF for a variety of grid resolutions using a single TFM image of a specified flaw. Thus, the grid resolution may be set so that it yields a desired AF using a calculation process without performing the blind iterative process described above. Moreover, examples of the present subject matter may measure AF in more than one axis, improving accuracy.

This document describes a method comprising: constructing a TFM image of a representation of a flaw in an object at a first grid resolution; from the TFM image, determining a center of mass of the representation of the flaw; identifying a major axis and a minor axis of the representation of the flaw; determining a plurality of pixel or voxel values from the TFM image along the major and minor axes; and based on the plurality of pixel or voxel values along the major and minor axes, determining a second grid resolution corresponding to a specified amplitude fidelity.

This document also describes a machine-storage medium embodying instructions that, when executed by a machine, cause the machine to perform operations comprising: constructing a TFM image of a representation of a flaw in an object at a first grid resolution; from the TFM image, determining a center of mass of the representation of the flaw; identifying a major axis and a minor axis of the representation of the flaw; determining a plurality of pixel or voxel values from the TFM image along the major and minor axes; and based on the plurality of pixel or voxel values along the major and minor axes, determining a second grid resolution corresponding to a specified amplitude fidelity.

This document further describes a system with one or more processors of a machine. The system also includes a memory storing instructions that, when executed by the one or more processors, cause the machine to perform operations comprising: constructing a TFM image of a representation of a flaw in an object at a first grid resolution; from the TFM image, determining a center of mass of the representation of the flaw; identifying a major axis and a minor axis of the representation of the flaw; determining a plurality of pixel or voxel values from the TFM image along the major and minor axes; and based on the plurality of pixel or voxel values along the major and minor axes, determining a second grid resolution corresponding to a specified amplitude fidelity.

Figure 1:
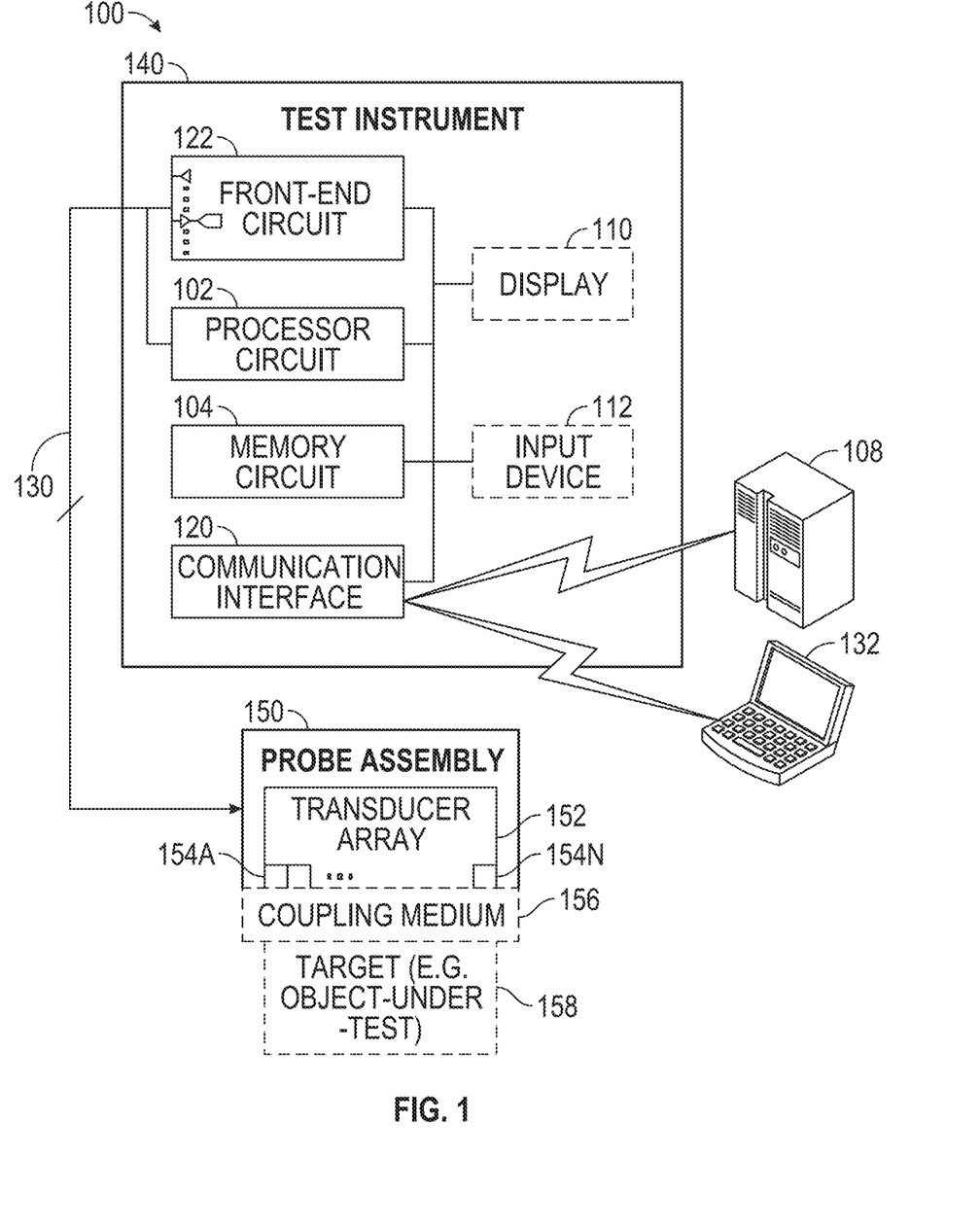
FIG. 1 illustrates an inspection system, according to an example of the present subject matter.

FIG. 1 illustrates generally an example comprising an acoustic inspection system 100, such as can be used to perform one or more techniques showed and described elsewhere herein. The inspection system 100 can include a test instrument 140, such as a hand-held or portable assembly. The test instrument 140 can be electrically coupled to a probe assembly, such as using a multi-conductor interconnect 130. The probe assembly 150 can include one or more electroacoustic transducers, such as a transducer array 152 including respective transducers 154A through 154N. The transducers array can follow a linear or curved contour or can include an array of elements extending in two axes, such as providing a matrix of transducer elements. The elements need not be square in footprint or arranged along a straight-line axis. Element size and pitch can be varied according to the inspection application.

A modular probe assembly 150 configuration can be used, such as to allow a test instrument 140 to be used with different probe assemblies 150. Generally, the transducer array 152 includes piezoelectric transducers, such as can be acoustically coupled to a target 158 (e.g., an object under test) through a coupling medium 156. The coupling medium can include a fluid or gel or a solid membrane (e.g., an elastomer or other polymer material), or a combination of fluid, gel, or solid structures. For example, an acoustic transducer assembly can include a transducer array coupled to a wedge structure comprising a rigid thermoset polymer having known acoustic propagation characteristics (for example, Rexolite® available from C-Lec Plastics Inc.), and water can be injected between the wedge and the structure under test as a coupling medium 156 during testing.

The test instrument 140 can include digital and analog circuitry, such as a front end-circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification.

While FIG. 1 shows a single probe assembly 150 and a single transducer array 152, other configurations can be used, such as multiple probe assemblies connected to a single test instrument 140, or multiple transducer arrays 152 used with a single or multiple probe assemblies 150 for tandem inspection. Similarly, a test protocol can be performed using coordination between multiple test instruments 140, such as in response to an overall test scheme established from a master test instrument 140, or established by another remote system such as a compute facility 108 or general purpose computing device such as a laptop 132, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit 122 can be coupled to and controlled by one or more processor circuits, such as a processor circuit 102 included as a portion of the test instrument 140. The processor circuit can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a compute facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of imaging data or intermediate data such as A-scan matrices of time-series data can be accomplished using remote facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, or the like, for receiving operator commands, configuration information, or responses to queries.

Figure 2:
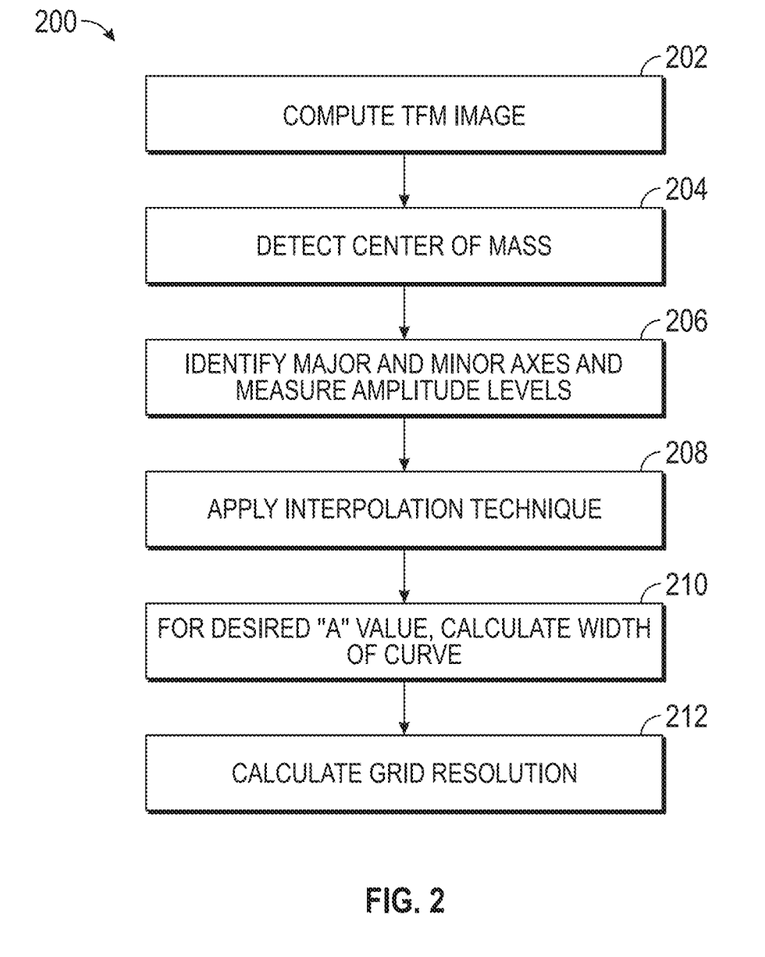
FIG. 2 is a flow diagram of a process to a calculate a grid resolution, according to an example of the subject matter.

Next, techniques to automatically set a TFM grid resolution (points per wavelength) for a desired AF will be described with reference to FIG. 2 and FIGS. 3A-3F. FIG. 2 is a flow diagram of a process 200 to calculate a grid resolution, according to an example of the subject matter. FIGS. 3A-3F show graphical representations of certain steps of process 200, according to an example of the subject matter.

At 202, a TFM image of a specified flaw in an object (e.g., calibration block) may be computed or constructed. The TFM image may be constructed using a preset grid resolution. The preset grid resolution may be comparatively higher than an estimated grid resolution for the desired AF. For example, the TFM image may be computed using a grid resolution of 10-20 points per wavelength while an estimated grid resolution for the desired AF (e.g., 2 dB) may be significantly less (e.g., 2-5 points per wavelength).

Figure 3A:
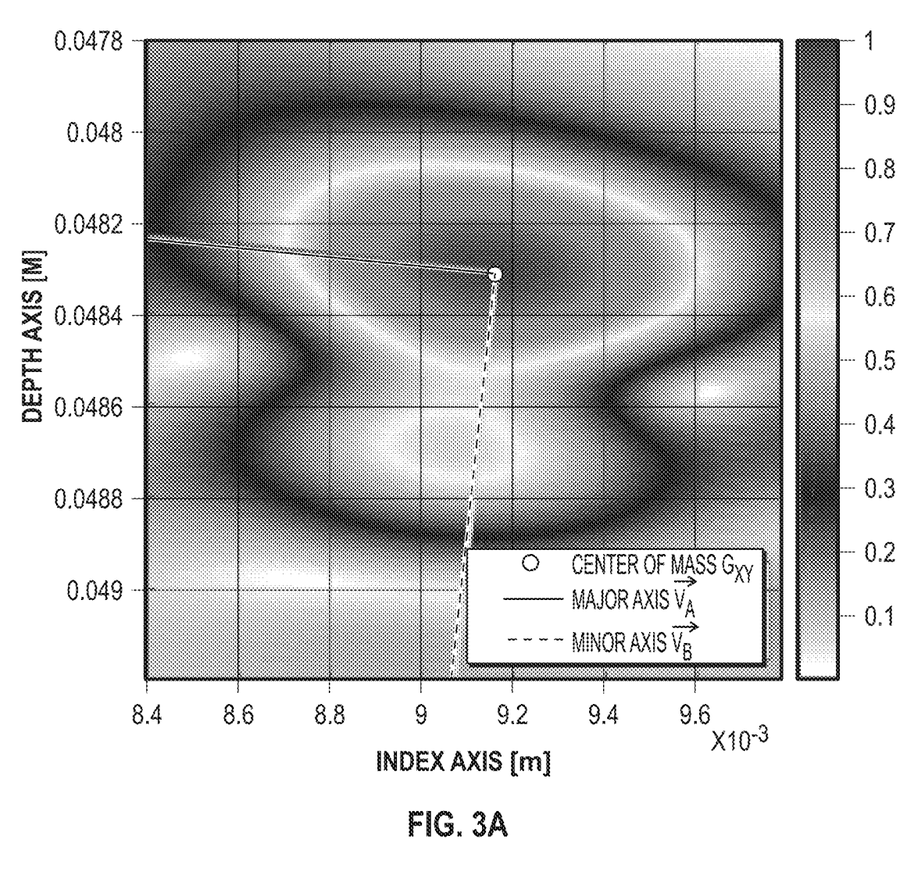
FIGS. 3A-3F show graphical representations of certain steps of a process to a calculate a grid resolution, according to an example of the subject matter.

FIG. 3A shows an example of a TFM image of a specified flaw (e.g., a side drill hole (SDH)) calculated at a preset grid resolution of approximately 20 points per wavelength. As shown, the echo reflections representing the SDH is depicted by an ellipse (e.g., the larger ellipse).

At 204, a center of mass of the flaw may be determined. The center of mass may be automatically detected by measuring pixel or voxel values (e.g., amplitude levels of the pixel or voxel values) and identifying a relevant point or an area. The point or area may be identified by using the statistical average of the measured amplitude levels. In another example, the point or area may be identified by using the maximum amplitude. The center of mass may also be computed using the standard weighted average for the position, <r>, such that $$\langle r \rangle = \frac{\sum_{n=1}^{N} |A_n| r_n}{\sum_{n=1}^{N} |A_n|}$$

where the summation index n runs over all N pixels of the image, each of which has its position r_n weigthed by the amplitude |A_n|. The amplitude may be filtered before computing the average. For instance, a threshold may be applied to the amplitude in order to retain only pixels with |A_n| values superior to said threshold before computing the average position. Other spatial filters could also be designed and applied on the image prior to the computation to discard amplitude artefact features for instance.

Figure 3B:
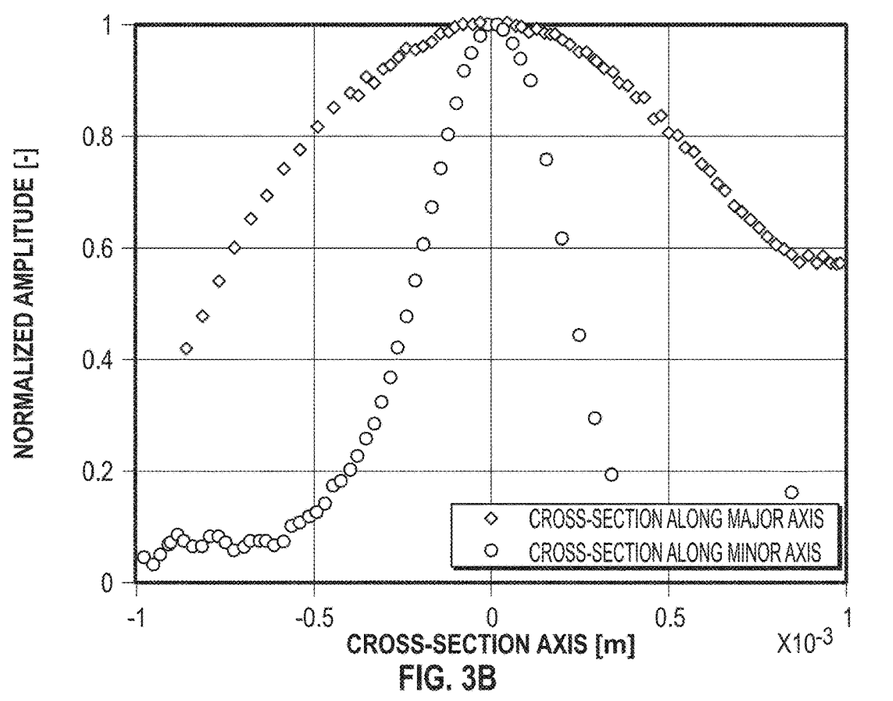

At 206, based on the detected center of mass, a major and a minor axis of the ellipse representing the flaw may be identified and pixel or voxel values (e.g., amplitude levels) may be measured for a plurality of points along the major and minor axes, respectively. The major axis may correspond to the beam waist axis, and the minor axis may correspond to the acoustic propagation direction. In FIG. 3A, the major and minor axes are identified. In FIG. 3B, cross-sections of the discrete measurements along both the major and minor axes are illustrated. The measurements may then be normalized, as shown in the graph. Also as shown, the measurements along the minor axis, which corresponds to the acoustic propagation direction, may vary more than the measurements along the major axis, the beam waist axis.

Figure 3C:
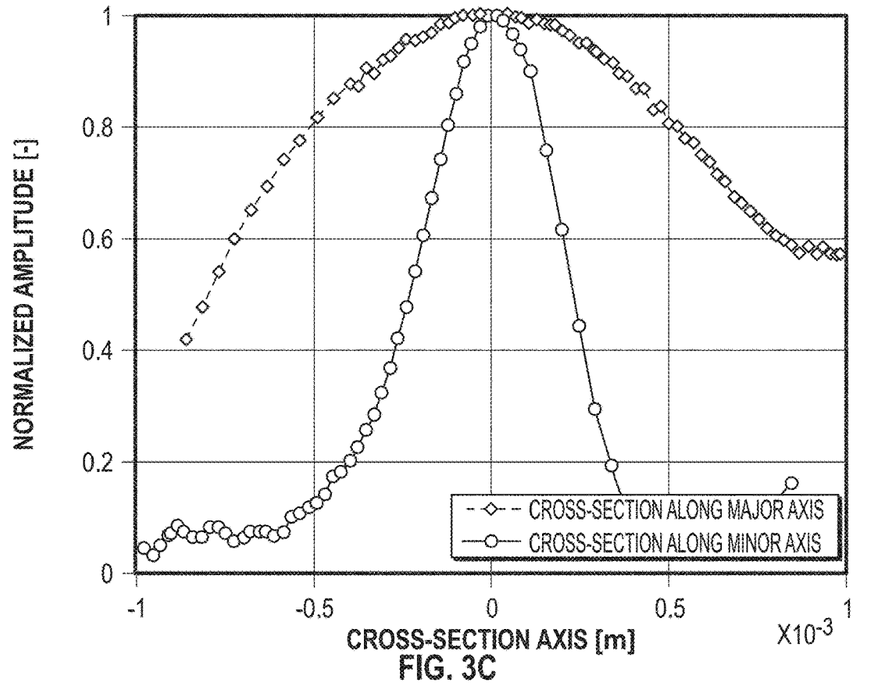
Figure 3D:
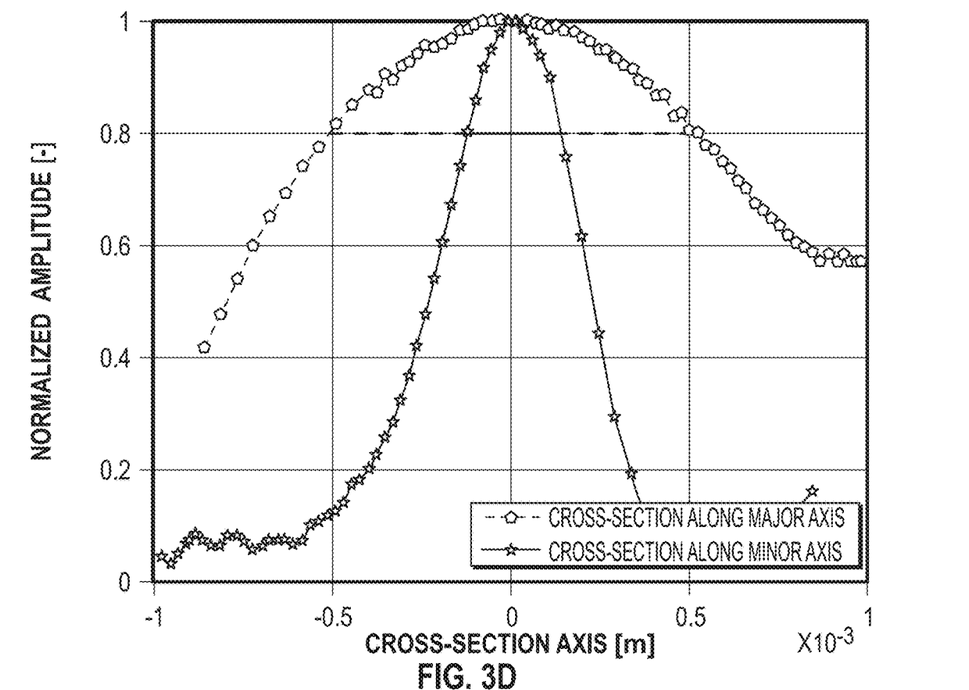

At 208, for both cross-sections, an interpolation technique may be applied to fill in points in-between the discrete measurements and achieve a better resolution. The interpolation technique may include a linear interpolation, a quadratic function, a quartic function, or other suitable interpolation techniques. In FIG. 3C, the cross-sections after interpolation are illustrated.

At 210, based on a selected normalized amplitude value "A" corresponding to the desired AF (e.g., "A" may approximately equal 0.8 for an AF of 2 dB), a width of the curve may be calculated. "A" may be selected by the operator or based on standard, codes, etc. The width of the curve may correspond to a length of a major (or minor) axis (a or b) of a target ellipse size.

Figure 3E:
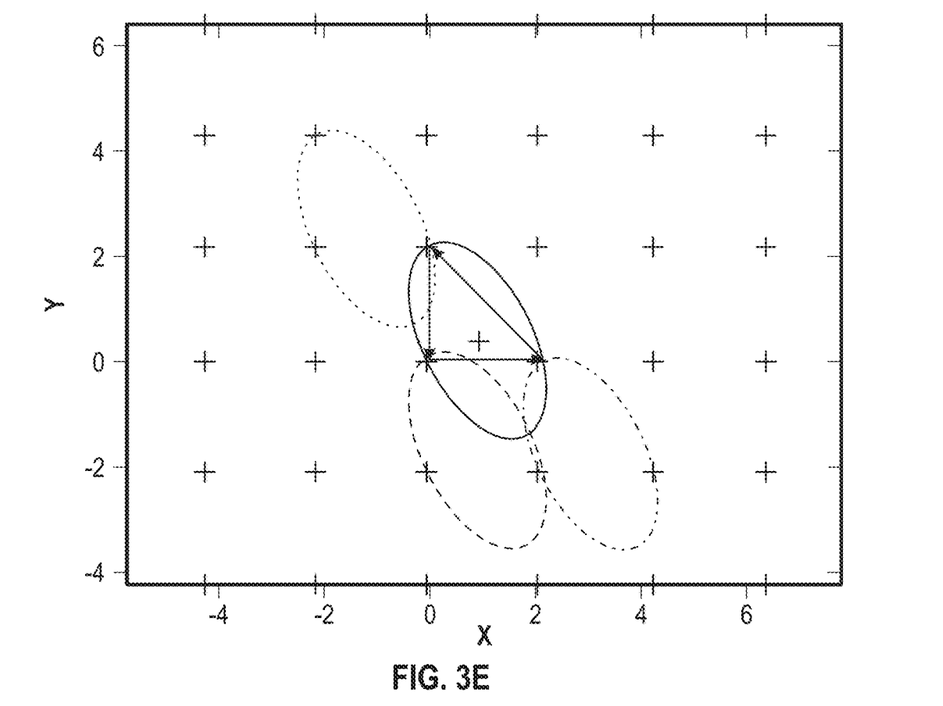

At 212, based on the target ellipse size, a grid resolution may be calculated to yield the desired AF. For example, the calculated grid resolution may allow three grid points to be along the target ellipse limit as a limiting case. FIG. 3E illustrates the calculated grid size, showing three grid points along the target ellipse shape. This illustrates the maximum grid size that satisfies the target minimum AF value sought for. Any translation of the ellipse over that grid may satisfy the target AF value.

Figure 3F:
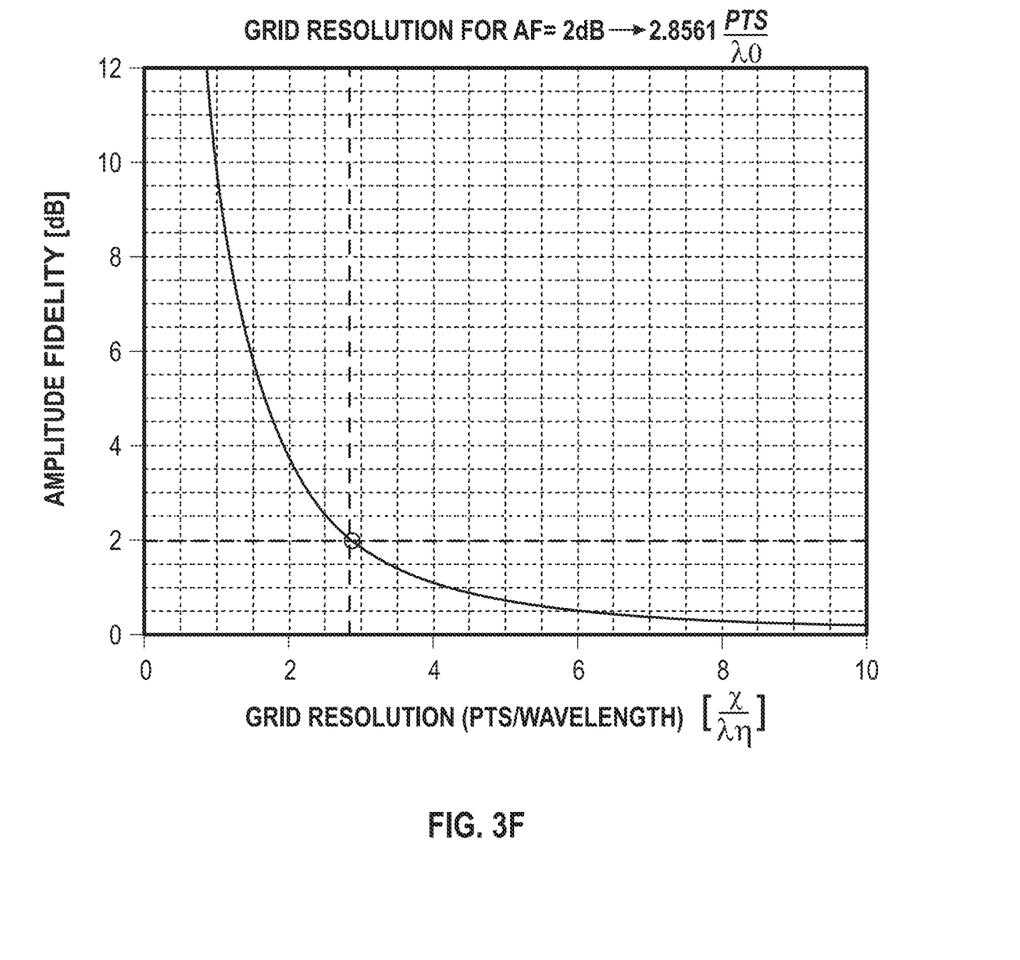

Steps 210-212 may be repeated for different AF values. Moreover, grid resolutions for different AF values may be compiled. For example, a table may be created with the results of steps 210-212 for different AF values. Those results may be inversed and interpolated to get grid resolution for any AF value. FIG. 3F illustrates a graph showing different AF values and their corresponding grid resolution values. In this example, for an AF of 2 dB, a grid resolution of 2.8561 points per wavelength was calculated. Other grid resolutions for different AF values may also be calculated.

Thus, the grid resolution corresponding to a desired AF may be calculated from a single TFM image, as opposed to a trial-and-error process using multiple TFM images. Also, the techniques described herein provide more simple operations, obviating the need for the technician to move the probe or grid to measure various AF values for a given resolution. Moreover, the techniques described herein accounts for the direction of the acoustic propagation.

Figure 4A:
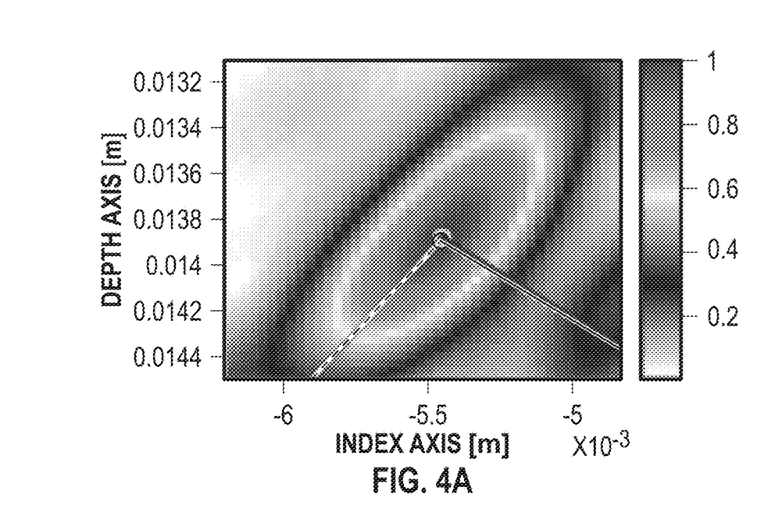
FIGS. 4A-4C show another example of graphical representations of certain steps of a process to a calculate a grid resolution, according to an example of the subject matter.
Figure 4B:
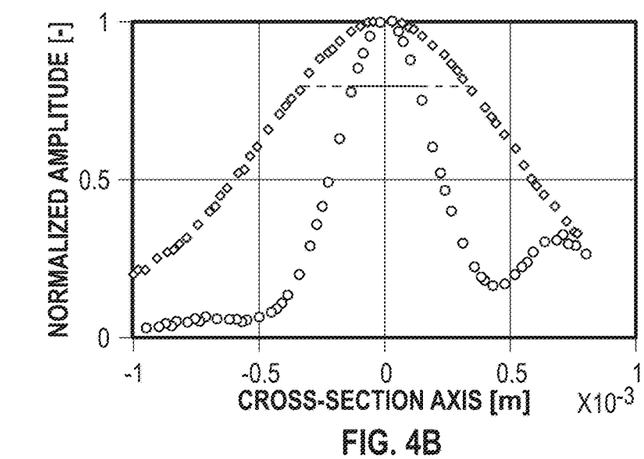
Figure 4C:
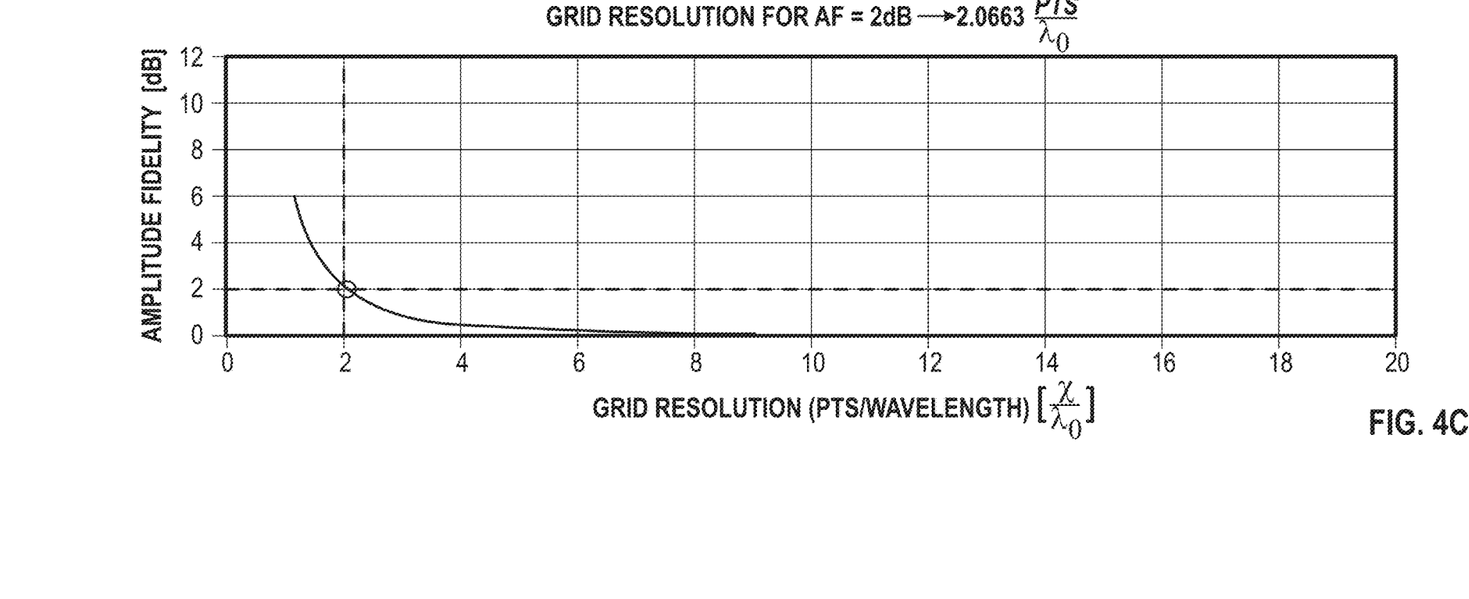

FIGS. 4A-4C illustrate another example of calculating grid resolutions for desired AF values using the techniques described herein. FIG. 4A shows a TFM image, identifying the center of mass and the major and minor axes for a specified flaw. FIG. 4B shows cross sections of the interpolated data for the amplitude measurements for the major and minor axes. FIG. 4C illustrates a graph show various AF values and their corresponding grid resolution values. In this example, for an AF of 2 dB, a grid resolution of 2.0663 points per wavelength was calculated.

Figure 5A:
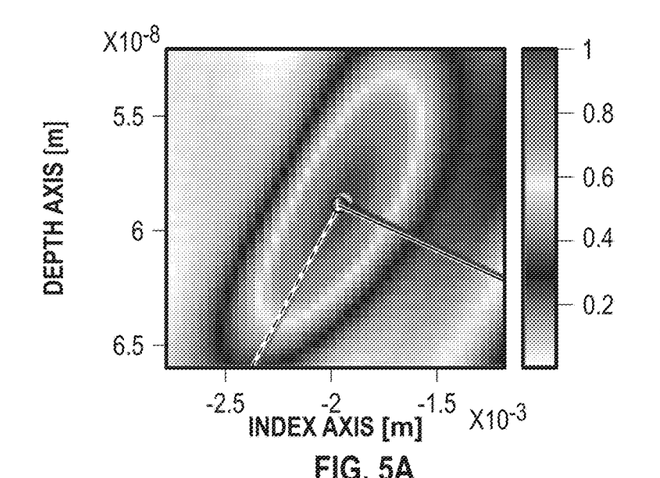
FIGS. 5A-5C show another example of graphical representations of certain steps of a process to a calculate a grid resolution, according to an example of the subject matter.
Figure 5B:
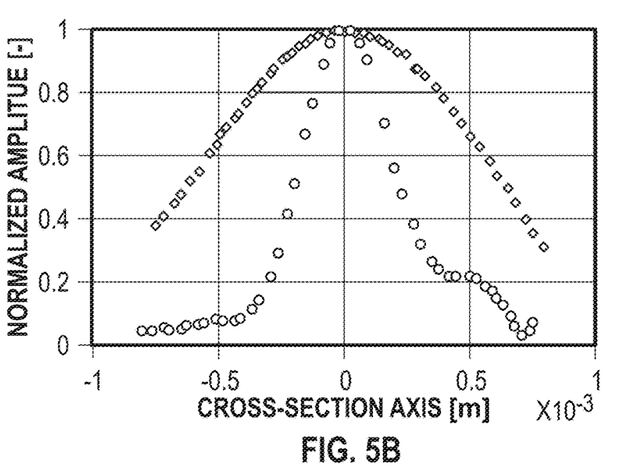
Figure 5C:
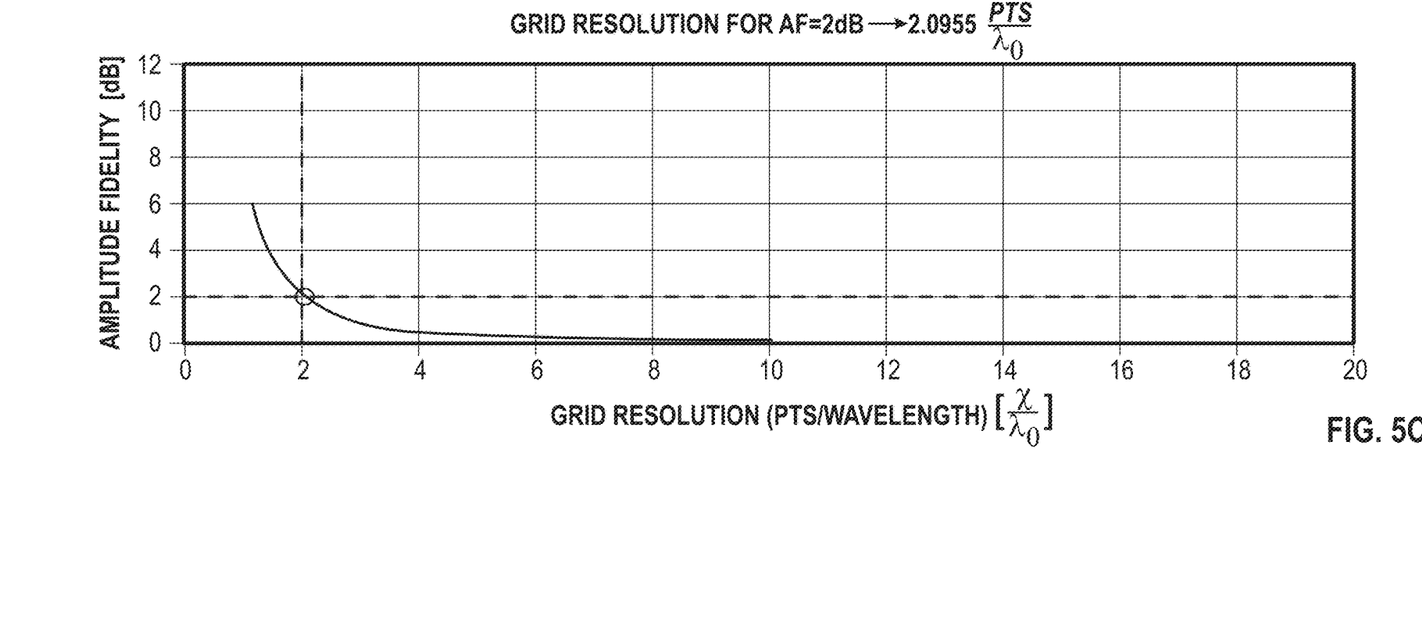

FIGS. 5A-5C illustrate another example of calculating grid resolutions for desired AF values using the techniques described herein. FIG. 5A shows a TFM image, identifying the center of mass and the major and minor axes for a specified flaw. FIG. 5B shows cross sections of the interpolated data for the amplitude measurements for the major and minor axes. FIG. 5C illustrates a graph show various AF values and their corresponding grid resolution values. In this example, for an AF of 2 dB, a grid resolution of 2.0955 points per wavelength was calculated.

Figure 6A:
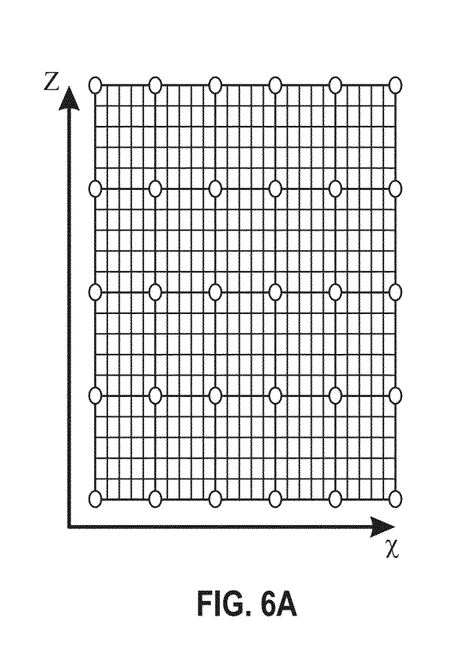
FIGS. 6A-6D illustrates portions of an AF validation process, according to an example of the subject matter.

After the TFM grid resolution is selected to yield the desired AF, the actual AF of the TFM image generated using the selected grid resolution may be validated. FIGS. 6A-6D illustrates portions of an AF validation process, according to an example of the subject matter. In FIG. 6A, the TFM image is shown at two different grid resolutions. The larger grid is the selected grid resolution to yield the desired AF value. The smaller grid resolution may be, for example, ten times smaller than the selected grid resolution. Then, the maximum amplitude may be measured in the TFM image with one-hundredth of the grid points for a uniform grid set.

Figure 6B:
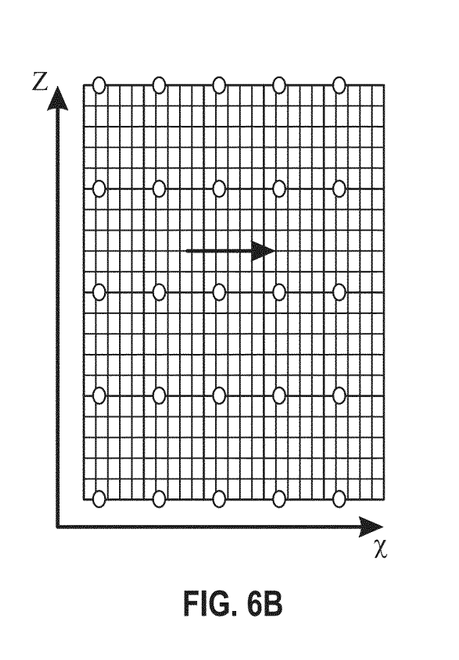
Figure 6C:
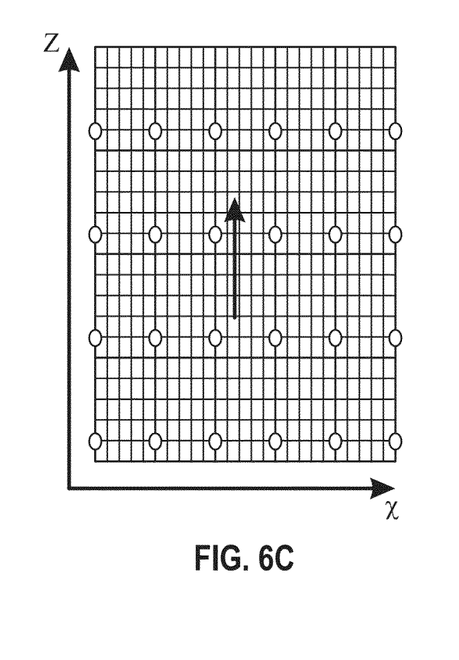
Figure 6D:
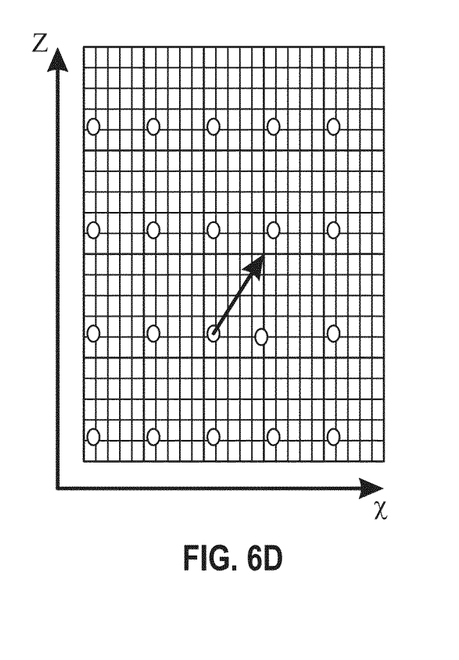

Next, the selected grid may be moved in different directions as shown in FIGS. 6B-6D. After each movement in a specified direction, the maximum amplitude may be measured using the one-hundredth grid points. For example, as shown in FIG. 6B, the grid may be moved in a horizontal direction (x-axis) and the maximum amplitude may be measured. As shown in FIG. 6C, the grid may then be moved in a vertical direction (z-axis) and the maximum amplitude may be measured. As shown in FIG. 6D, the grid may then be moved in a diagonal direction and the maximum amplitude may be measured. The amplitude fidelity may be calculated using the log of the ratio between highest and lowest maximum amplitude measurements performed after the movement in the different directions.

Figure 7:
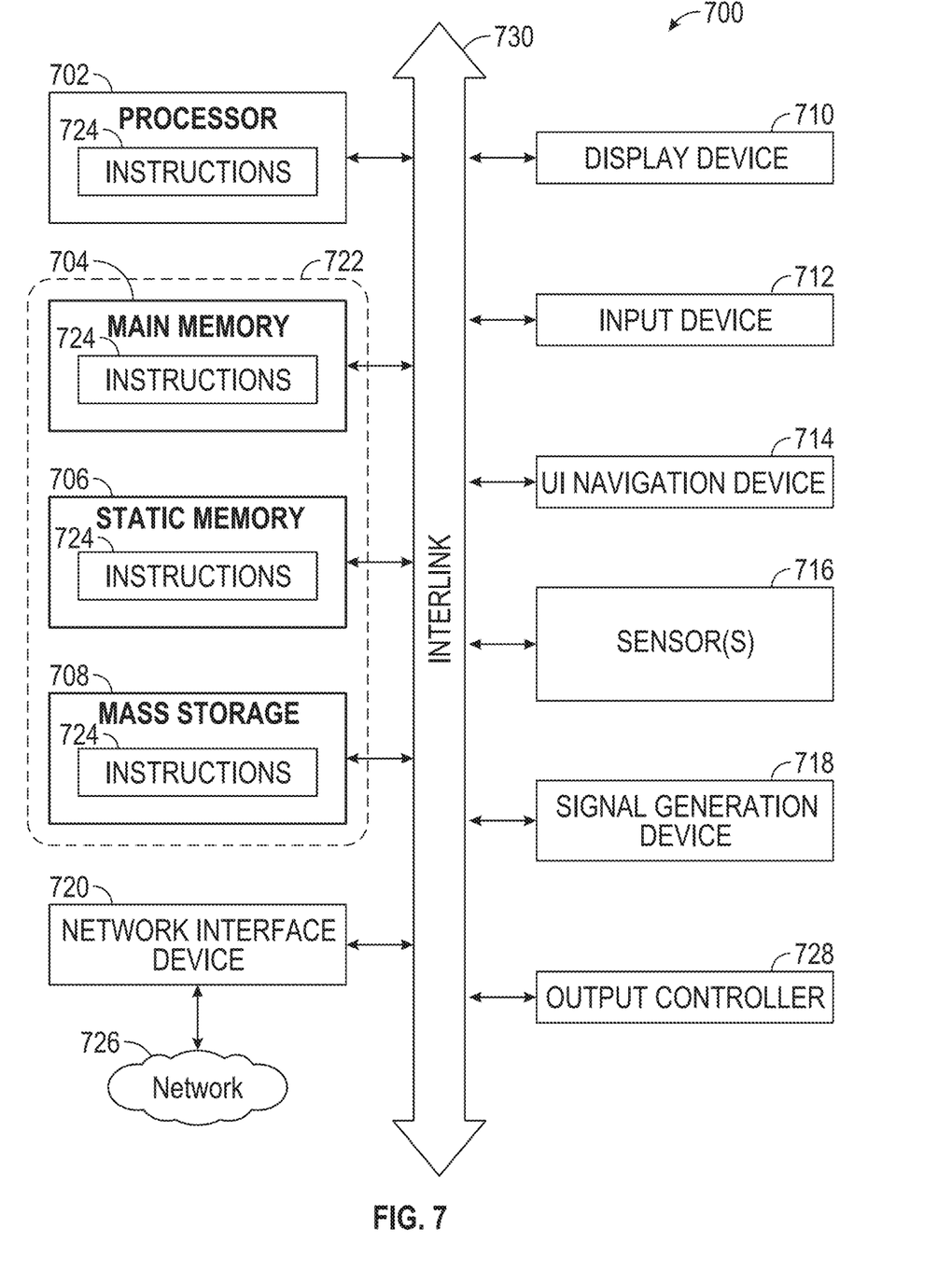
FIG. 7 illustrates a block diagram of an example comprising a machine upon which any one or more of the techniques (e.g., methodologies) discussed herein may be performed.

The techniques shown and described in this document can be performed using a portion or an entirety of an inspection system 100 as shown in FIG. 1 or otherwise using a machine 700 as discussed below in relation to FIG. 7. FIG. 7 illustrates a block diagram of an example comprising a machine 700 upon which any one or more of the techniques (e.g., methodologies) discussed herein may be performed. In various examples, the machine 700 may operate as a stand-alone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 720, an alphanumeric input device 722 (e.g., a keyboard), and a user interface (UI) navigation device 724 (e.g., a mouse). In an example, the display unit 720, input device 722 and UI navigation device 724 may be a touch screen display. The machine 700 may additionally include a storage device (e.g., drive unit) 726, a signal generation device 728 (e.g., a speaker), a network interface device 720, and one or more sensors 722, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 726 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 707, or the storage device 726 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.22 family of standards known as Wi-Fi®, IEEE 802.26 family of standards known as WiMax®), IEEE 802.25.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description as examples or implementations, with each claim standing on its own as a separate implementation, and it is contemplated that such implementations can be combined with each other in various combinations or permutations. The scope of the invention should be determined with reference to the appended claims, along with the full scope of equivalents to which such claims are entitled.

What is claimed is:

1. A method comprising:
constructing a total-focusing method (TFM) image of a representation of a flaw in an object at a first grid resolution;
determining a center of mass of the representation of the flaw based on the constructed TFM image;
identifying a major axis and a minor axis of the representation of the flaw based on the center of mass, wherein the major axis defines a beam waist axis and the minor axis defines an acoustic propagation direction;
determining a plurality of pixel or voxel values from the TFM image along the major and minor axes;
calculating a width of a curve corresponding to a length of an axis of a target eclipse based on a specified amplitude fidelity (AF); and
based on the plurality of pixel or voxel values along the major and minor axes and the calculated width of the curve, determining a second grid resolution corresponding to the specified AF so that at least three grid points fall along the target ellipse.

2. The method of claim 1, further comprising:
applying an interpolation technique to the plurality of pixel or voxel values along the major and minor axes.

3. The method of claim 2, further comprising:
normalizing the pixel or voxel values along the major and minor axes.

4. The method of claim 1, further comprising:
constructing a second TFM image of representation at the second grid resolution; and
verifying the AF value of the second TFM image.

5. The method of claim 4, wherein verifying the AF value comprises:
validating the AF value by moving a grid of the second TFM image in a plurality of different directions.

6. The method of claim 1, wherein the first grid resolution is greater than the second grid resolution.

7. A machine-storage medium embodying instructions that, when executed by a machine, cause the machine to perform operations comprising:
constructing a total-focusing method (TFM) image of a representation of a flaw in an object at a first grid resolution;
determining a center of mass of the representation of the flaw based on the constructed TFM;
identifying a major axis and a minor axis of the representation of the flaw based on the center of mass, wherein the major axis defines a beam waist axis and the minor axis defines an acoustic propagation direction;
determining a plurality of pixel or voxel values from the TFM image along the major and minor axes;
calculating a width of a curve corresponding to a length of an axis of a target eclipse based on a specified amplitude fidelity (AF); and
based on the plurality of pixel or voxel values along the major and minor axes and the calculated width of the curve, determining a second grid resolution corresponding to the specified AF so that at least three grid points fall along the target ellipse.

8. The machine-storage medium of claim 7, further comprising:
applying an interpolation technique to the plurality of pixel or voxel values along the major and minor axes.

9. The machine-storage medium of claim 8, further comprising:

normalizing the plurality of pixel or voxel values along the major and minor axes.

10. The machine-storage medium of claim 7, further comprising:
constructing a second TFM image of representation at the second grid resolution; and
verifying the AF value of the second TFM image.

11. The machine-storage medium of claim 10, wherein verifying the AF value comprises:
validating the AF value by moving a grid of the second TFM image in a plurality of different directions.

12. The machine-storage medium of claim 7, wherein the first grid resolution is greater than the second grid resolution.

13. A system comprising:
one or more processors of a machine; and
a memory storing instructions that, when executed by the one or more processors, cause the machine to perform operations comprising:
constructing a total-focusing method (TFM) image of a representation of a flaw in an object at a first grid resolution;
determining a center of mass of the representation of the flaw based on the constructed TFM image;
identifying a major axis and a minor axis of the representation of the flaw based on the center of mass, wherein the major axis defines a beam waist axis and the minor axis defines an acoustic propagation direction;
determining a plurality of pixel or voxel values from the TFM image along the major and minor axes;
calculating a width of a curve corresponding to a length of an axis of a target eclipse based on a specified amplitude fidelity (AF), and
based on the plurality of pixel or voxel values along the major and minor axes and the calculated width of the curve, determining a second grid resolution corresponding to the specified AF so that at least three grid points fall along the target ellipse.

14. The system of claim 13, the operations further comprising:
applying an interpolation technique to the plurality of pixel or voxel values along the major and minor axes.

15. The system of claim 14, the operations further comprising:
normalizing the plurality of pixel or voxel values along the major and minor axes.

16. The system of claim 13, the operations further comprising:
constructing a second TFM image of representation at the second grid resolution; and
verifying the AF value of the second TFM image.

17. The system of claim 16, wherein verifying the AF value comprises:
validating the AF value by moving a grid of the second TFM image in a plurality of different directions.

18. The system of claim 13, wherein the first grid resolution is greater than the second grid resolution.

* * * * *

UNITED STATES PATENT AND TRADEMARK OFFICE
CERTIFICATE OF CORRECTION

PATENT NO. : 11,494,873 B2
APPLICATION NO. : 17/066798
DATED : November 8, 2022
INVENTOR(S) : Badeau et al.

It is certified that error appears in the above-identified patent and that said Letters Patent is hereby corrected as shown below:

In the Claims

In Column 12, Line 3, in Claim 13, delete "(AF)," and insert --(AF);-- therefor

Signed and Sealed this
Fifth Day of September, 2023

Katherine Kelly Vidal
*Director of the United States Patent and Trademark Office*